US012641546B2

(12) United States Patent
Wang et al.

(10) Patent No.: US 12,641,546 B2
(45) Date of Patent: May 26, 2026

(54) METHODS, SYSTEMS AND DEVICES FOR VARYING WIRELESS TRANSMIT POWER BASED ON PATH LOSS INFORMATION

(71) Applicant: Cypress Semiconductor Corporation, San Jose, CA (US)

(72) Inventors: Xianmin Wang, Westfield, NJ (US); Hui Luo, Marlboro, NJ (US); Hongwei Kong, Basking Ridge, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 570 days.

(21) Appl. No.: 17/873,441

(22) Filed: Jul. 26, 2022

(65) Prior Publication Data

US 2022/0408370 A1      Dec. 22, 2022

Related U.S. Application Data

(62) Division of application No. 16/572,195, filed on Sep. 16, 2019, now Pat. No. 11,432,247.

(60) Provisional application No. 62/836,846, filed on Apr. 22, 2019.

(51) Int. Cl.
| | |
|---|---|
| *H04W 4/02* | (2018.01) |
| *H04W 52/24* | (2009.01) |
| *H04W 52/36* | (2009.01) |
| *H04W 72/044* | (2023.01) |
| *H04L 101/622* | (2022.01) |
| *H04W 84/12* | (2009.01) |

(52) U.S. Cl.
CPC ....... *H04W 52/242* (2013.01); *H04W 52/367* (2013.01); *H04W 72/0473* (2013.01); *H04L 2101/622* (2022.05); *H04W 84/12* (2013.01)

(58) Field of Classification Search
None
See application file for complete search history.

(56) References Cited

U.S. PATENT DOCUMENTS

| | | | | |
|---|---|---|---|---|
| 9,426,664 | B2 * | 8/2016 | Hong | H04W 72/51 |
| 9,485,243 | B2 * | 11/2016 | Weksler | H04W 12/122 |
| 11,265,916 | B2 * | 3/2022 | Fodor | H04W 16/14 |

(Continued)

FOREIGN PATENT DOCUMENTS

| | | |
|---|---|---|
| CN | 102026359 A | 4/2011 |
| CN | 104540172 A | 4/2015 |
| KR | 20150141903 A | 12/2015 |

OTHER PUBLICATIONS

Chinese Office Action from Application 202080023599.4 for, dated Apr. 22, 2025; 5 pages.

*Primary Examiner* — Sithu Ko

(57) ABSTRACT

A method can include at a first station in a wireless network, receiving path loss (PL) transmissions from at least a second station, dynamically changing power for transmissions from the first station to the second station based on the received PL information, determining PL values for transmissions received at the first station from other stations, and sending PL transmissions from the first station that include the determined PL values for at least one other station. The PL transmissions are configured to be received by stations of the same wireless network and stations of a different wireless network. Corresponding devices and systems are also disclosed.

14 Claims, 10 Drawing Sheets

(56)    References Cited

U.S. PATENT DOCUMENTS

| | | | |
|---|---|---|---|
| 2002/0168993 A1* | 11/2002 | Choi | H04W 52/24 |
| | | | 455/62 |
| 2011/0096760 A1 | 4/2011 | Lee et al. | |
| 2016/0021619 A1* | 1/2016 | Lee | H04W 52/242 |
| | | | 370/252 |
| 2016/0174079 A1* | 6/2016 | Wang | H04W 16/14 |
| | | | 455/454 |
| 2017/0070961 A1* | 3/2017 | Bharadwaj | H04W 52/228 |
| 2017/0118661 A1* | 4/2017 | Xu | H04W 24/02 |
| 2017/0181102 A1* | 6/2017 | Bharadwaj | H04W 52/242 |
| 2018/0295601 A1* | 10/2018 | Wang | G01S 1/44 |
| 2018/0302862 A1* | 10/2018 | Takata | H04W 52/18 |
| 2020/0100193 A1* | 3/2020 | Cheng | H04W 52/146 |

* cited by examiner

322

| TX | |
|---|---|
| PLx | MAC ADDRESS OF BEACON SENDING STAx |
| PLy | MAC ADDRESS OF BEACON SENDING STAy |

OCTETS 1 6

METHODS, SYSTEMS AND DEVICES FOR VARYING WIRELESS TRANSMIT POWER BASED ON PATH LOSS INFORMATION

This application is a divisional of U.S. patent application Ser. No. 16/572,195 filed on Sep. 16, 2019, which claims the benefit of U.S. provisional patent application No. 62/836,846, filed on Apr. 22, 2019, all of which are incorporated by reference herein in their entirety.

TECHNICAL FIELD

The present disclosure relates generally to wireless systems, and more particularly to wireless systems with devices having dynamic adjustment of transmission power based on the operating environment.

BACKGROUND

Currently, IEEE 802.11 wireless standards do not require a station (STA) to control transmit (TX) power as long as the TX power does not exceed the maximum allowed threshold, i.e. spectrum mask. In a dense Wi-Fi deployment environment, transmissions on a channel (e.g., 80 MHz channel) are limited by bandwidth contention of overlapping basic service sets (OBSSs). For example, in a dense deployment of mixed Wi-Fi STAs, like 802.11a, 802.11n, 802.11ac etc., the probability of having no contention on any of the 20 MHz channels inside an 80 MHz bandwidth is small. Hence, the chance of transmission over the entire 80 MHz BW becomes rare, and overall throughput suffers.

The arriving IEEE 802.11ax standard has provisions to allow adjustable TX power at STAs to promote parallel transmission in strong OBSS environments. However, there is no clear indication on how TX power control is utilized or established.

DETAILED DESCRIPTION

Figure 1:
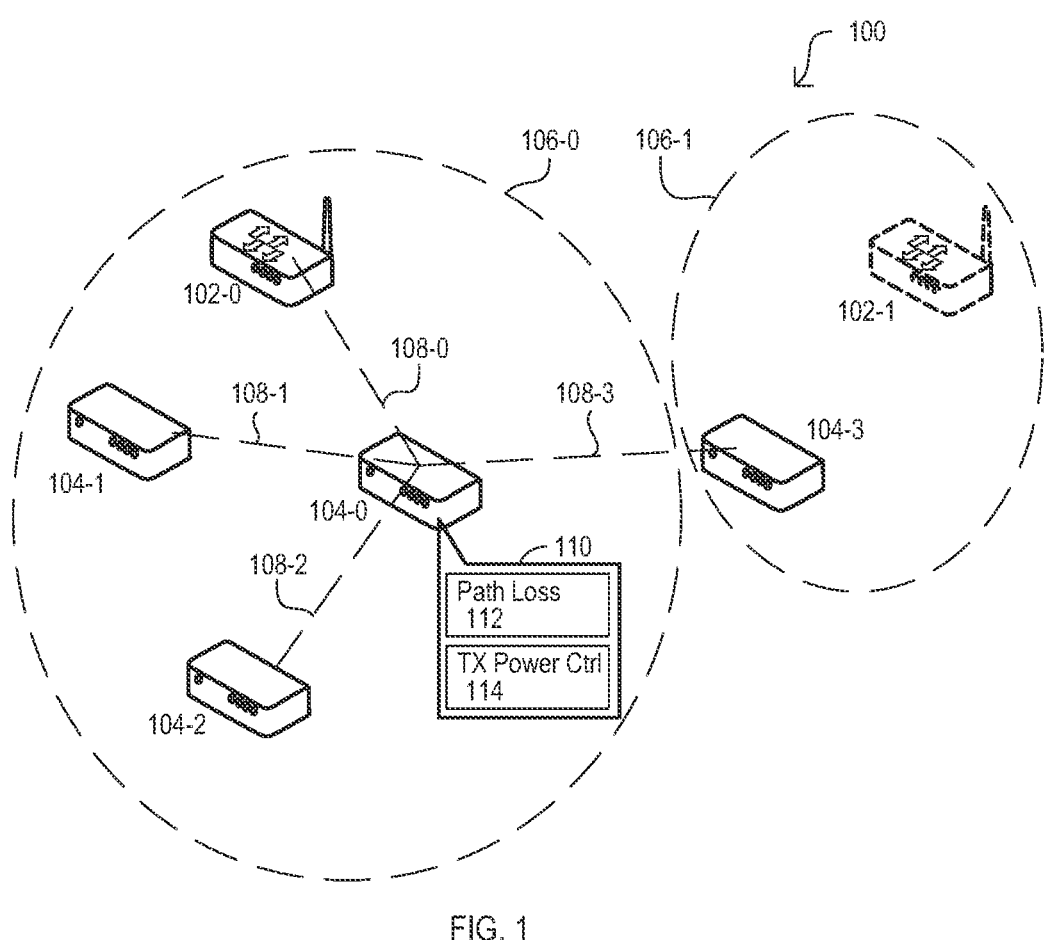
FIG. 1 is a block diagram of a system according to an embodiment.

According to embodiments, sending stations (STAs) of a wireless network (e.g., basic service set, BSS) can determine and use a lowest possible transmit (TX) power that can assure sufficient signal strength (e.g., signal-to-interference plus noise ratio, SINR) for its data to be received correctly at a destination STA. Thus, the sending STAs can introduce a lowest possible interference, or greatly reduced interference, at the other STAs of the network and any neighboring networks.

In some embodiments, some data transfers can be carried out in parallel among overlapping networks (overlapping BSSs, OBSS). STAs of different networks can determine if a received signal strength (e.g., a received signal strength indicator, RSSI) of a transmission at a STA of a neighboring network will remain below an interference threshold (e.g., clear channel assessment, CCA) of the neighbor STA. If so (i.e., threshold not exceeded), the transmission can be made. If not (i.e., threshold exceeded), the transmission can be delayed or cancelled.

According to embodiments, STAs can be capable of exchanging and broadcasting path loss (PL) information for all compatible STAs within range. PL information can be essentially instantaneous, being periodically updated and transmitted from each STA. Based on the PL information, a sending STA can determine a lowest required TX power using the PL info from itself to its destination (i.e., the receiving) STA. Each STA can use PL information obtained from the most recent broadcast (e.g., beacon frame) sent from its destination STA.

According to embodiments, STAs can determine PL values from broadcasts sent by other STAs. In some embodiments, the broadcasts can include beacon frames having an information element (IE) with a TX power value (for the sending STA) and one or more PL values with an associated STA identifier (e.g., MAC address). From the STA identifiers of such a broadcast, a STA can find PL values for itself. After learning its PL values, the STA can transmit with a TX power that can offset the PL loss to a destination STA. In some embodiments, some safety margin can be added on top of minimum TX power to ensure throughput performance. An overall TX power can be lower than a maximum TX power or default TX power for the system.

According to embodiments, STAs can calculate[d] PL values from broadcasts sent by other STAs. In some embodiments, a PL value for another STA can be determined from the difference between a TX power value in a beacon from the other STA, and the received signal strength (RSSI) at the receiving STA. Such a PL value can be stored and then included in a beacon transmitted by the STA.

In some embodiments, in the case a STA is to transmit to multiple STAs (e.g., a multicast frame), the sending STA can use a TX power determined to offset the highest PL from among all destination STAs (plus an optional safety margin, in some embodiments). In the case of transmitting to all STAs (i.e., a broadcast frame), the sending STA can use a maximum allowed TX power.

In some embodiments, PL information can be periodically transmitted to all STAs of a wireless network, as well as STAs of a neighboring wireless network.

In some embodiments, a STA can calculate and exchange an instantaneous PL report from itself to other compatible STAs in its own and other BSSs. Based on such reports, a STA can calculate an appropriate TX power introducing minimum OBSS interference for simultaneous data transfer in other BSSs. Based on instantaneous PL information, compatible sending STAs can transmit data using the lowest possible TX power that can assure sufficient SNR for its data to be received correctly at its destination STA. When all STAs operate in this manner, sending STAs can introduce a lowest possible interference at other STAs that are not its data destination. Hence, there can be a higher chance that data transfers can happen in parallel among OBSSs if communicating STA pairs are separated enough and if the RSSI of the TX power of a sending STA for one pair remains below CCA sensing threshold of other STA pairs.

In the various embodiments below, like items are referred to by the same reference characters, but with the leading digit(s) corresponding to the figure number.

Referring to FIG. 1, a system 100 according to an embodiment is shown in a diagram. A system 100 can include an access point (AP) 102-0 and a number of STAs (104-0 to -2). AP 102-0 can enable STAs (104-0 to -2) to access one or more other networks. AP 102-0 and STAs (104-0 to -2) can communicate with one another through wireless transmissions to form a wireless network 106-0. When such communications are initiated, they can be conceptualized as occurring over paths. For example, FIG. 1 shows paths 108-0 to -2 between STA 102-0 and the various other devices of network 106-0. It is understood that the other STAs 104-1 and -2 have similar paths to the other devices of the system.

In FIG. 1, STA 104-0 is shown to include communication circuits 110, which can enable dynamic power control of transmitted signals based on received PL information for a destination device (e.g., STA or AP). It is understood that any or all of STAs/AP (102, 104-0 to -2) can include such communication circuits 110. Communication circuits 110 can include a PL section 112 and a transmit (TX) power control section 114. A PL section 112 can store PL information for paths to other STAs/AP the same wireless network 106-0, and in some cases, devices in a neighboring wireless network. Such PL information can be received by other devices (STA/APs) of the same wireless network 106-0, as well as devices of a neighboring wireless network. In some embodiments, PL information can be updated over time, enabling transmissions to adapt as the environment changes.

In addition, or alternatively, a PL section 112 can determine a PL value from transmissions received from other devices (STA/APs). Such PL information can then be transmitted back to the sending device. Such transmissions can be broadcast (addressed to all devices in range), sent directly to the sending device, or sent indirectly to the sending device (e.g., via an AP or other intervening device).

A TX power control section 114 can adjust the transmission power for transmissions to other STAs or APs. In particular, a TX power control section 114 can reduce TX power from a maximum allowable level for a transmission based on PL information for a destination, thus minimizing the possibility of the transmission interfering with other devices in the vicinity. In some embodiments, a TX power control section 114 can determine a[t] TX power level that can account for any PL and meet some minimum threshold (e.g., RSSI) for the destination, while at the same time transmitting below a maximum power level, if possible. As but one example, a TX power control 112 can give a transmit power of:

$$TX\ power=target\ RX+PL+margin$$

where target RX can is a desired power level at the receiving device, PL is the path loss from the transmitting device to the receiving device, and margin is a predetermined amount of additional power to help ensure the signal is received.

In this way, transmissions between wireless devices can be selectively lowered from a default or maximum power to reduce possible interference with other networks (e.g., bands).

In some embodiments, a STA can include PL information for devices outside of its own wireless network. The STA can use this neighboring PL information to control its own transmissions to thereby reduce or eliminate interference with the neighboring device. For example, referring still to FIG. 1, in addition to wireless network 106-0, there can be an adjacent wireless network 106-1 that can include one or more other STAs (one shown as 104-3) and optionally another AP 102-1. STA 104-0 of the first wireless network 106-0 can include PL information for path 108-3 to STA 104-3 of the neighboring wireless network 106-1. STA 104-0 can monitor a channel on which neighboring STA 104-3 can transmit. If STA 104-0 determines neighboring STA 104-3 is transmitting, it can adjust or defer its own transmissions to reduce or eliminate interference with the transmission of the neighboring STA 104-3.

In an embodiment, wireless network 106-0 can be a basic service set (BSS) operating according to an IEEE wireless standard. Wireless network 106-1 can be an overlapping BSS (OBSS) operating according to the same or another IEEE wireless standard. In some embodiments, wireless network 106-0 can operate according to the IEEE 802.11ax standard.

According to embodiments, devices of a wireless network can transmit PL information to one another in any suitable manner, including directly (transmissions from one device to the other) as well as indirectly (transmission via another device, such as a shared AP as but one example). In some embodiments, devices can use beacon-like transmissions to convey PL information to other devices. A beacon-like transmission can be a transmission that can be received by multiple devices of the same wireless network and may be a beacon according to a standard or protocol. One such embodiment will now be described with reference to FIGS. 2A to 2E.

FIGS. 2A to 2E are a sequence of diagrams showing operations of a wireless system 200 that includes STAs 204-0 to -2. STAs (204-0 to -2) can communicate wirelessly with one another according to a predetermine standard or protocol. Such communications can include the transmission and reception of data frames or packets. Each STA can include its own PL section 210-0 to -2. PL sections (210-0 to -2) can each include a calculation section 212-0 to -2 and a data received section 214-0 to -2.

Calculation sections (212-0 to -2) can generate PL values from transmissions received from other STAs. PL values can represent a difference in signal power between the signal at transmitting STA and the strength of signal at the receiving STA. Calculated PL values can then be transmitted out for reception and storage by other STAs.

Figures 2A, 2B, 2C:
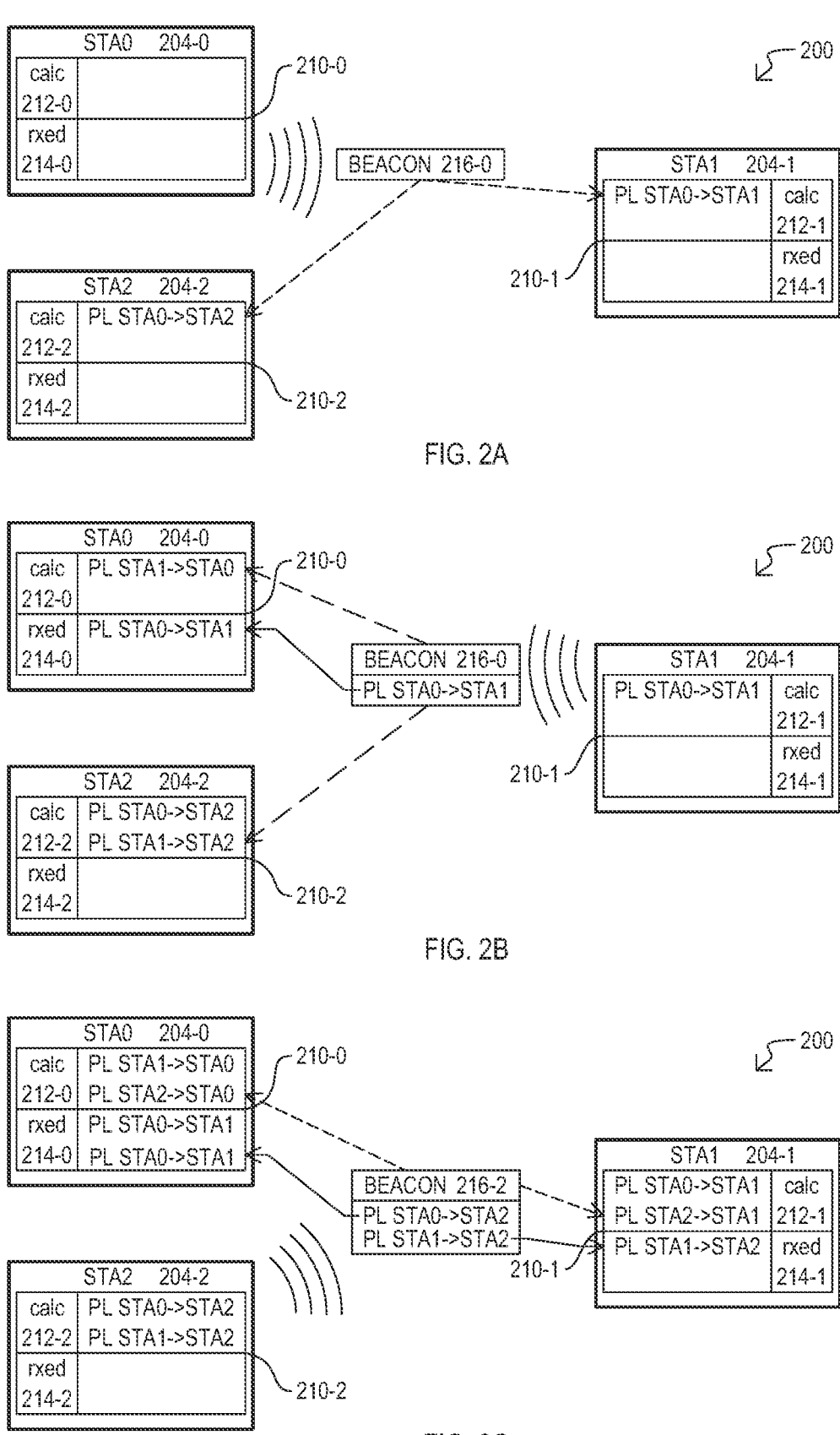
FIGS. 2A to 2C are a series of diagrams showing stations (STAs) of a system that can calculate path loss values and distribute such values to other STAs with beacon-like transmissions.

Referring to FIG. 2A, STA 204-0 can send a beacon-like transmission 216-0. Transmission 216-0 can have a format that allows it to be detected by the other STAs of system 200 (e.g., a type, address or other field that identifies the transmission). A transmission 216-0 can take any suitable form, including a data frame or packet, and can include a transmission power value TX(0), which can correspond to the power level at STA 204-0 when the transmission 216-0 is sent. Transmission 216-0 can be received by STA1 204-1 and STA2 204-2, which can extract the TX(0) value, and determine a received signal strength (e.g., RSSI) for the transmission 216-0. With such values, STA1 and STA2 (204-1/2) can calculate PL values. Thus, STA1 204-1 can calculate and store a PL value "PL STA0->STA1" in its calculation section 212-1, and STA2 204-2 can calculate and store a PL value "PL STA0->STA2" in it its calculation section 216-2.

Stations can then begin to send their own beacons, enabling all to accumulate PL values for all other STAs.

Referring to FIG. 2B, station STA 204-1 can send its own beacon-like transmission 216-1. Transmission 216-1 can include a TX power value TX(1), which can correspond to the power level at STA 204-1 when sent. In the embodiment shown, transmission 216-1 can also include PL info that has been calculated by the STA 204-1 (i.e., PL STA0->STA1).

Transmission 216-1 can be received by STA0 204-0 and STA2 204-2, which can extract the TX(1) value, and determine a received signal strength for the transmission 216-1. Thus, STA0 204-0 can calculate a PL value "PL STA1->STA0" in its calculation section 212-0 and STA2 204-2 can calculate PL value "PL STA1->STA2" in its calculation section 212-2. In addition, STA0 204-0 can identify the PL value included in transmission 216-1 ("PL STA0->STA1") as corresponding to itself, and so can extract and store the PL value in its received section 214-0.

Referring to FIG. 2C, the same general operation as shown in FIG. 2B occurs, only now with STA 204-2. STA 204-2 can send beacon-like transmission 216-2 which can include TX power value TX(2) as well as the PL values it has calculated. STA0 204-0 can store its corresponding PL value (i.e., PL STA0->STA2) and can calculate a PL value (STA2->STA0) from the transmission 216-2. Likewise, STA1 204-1 can store its corresponding PL value (i.e., PL STA1->STA2) and calculate a PL value STA2->STA1 from the transmission 216-2.

Figures 2D, 2E:
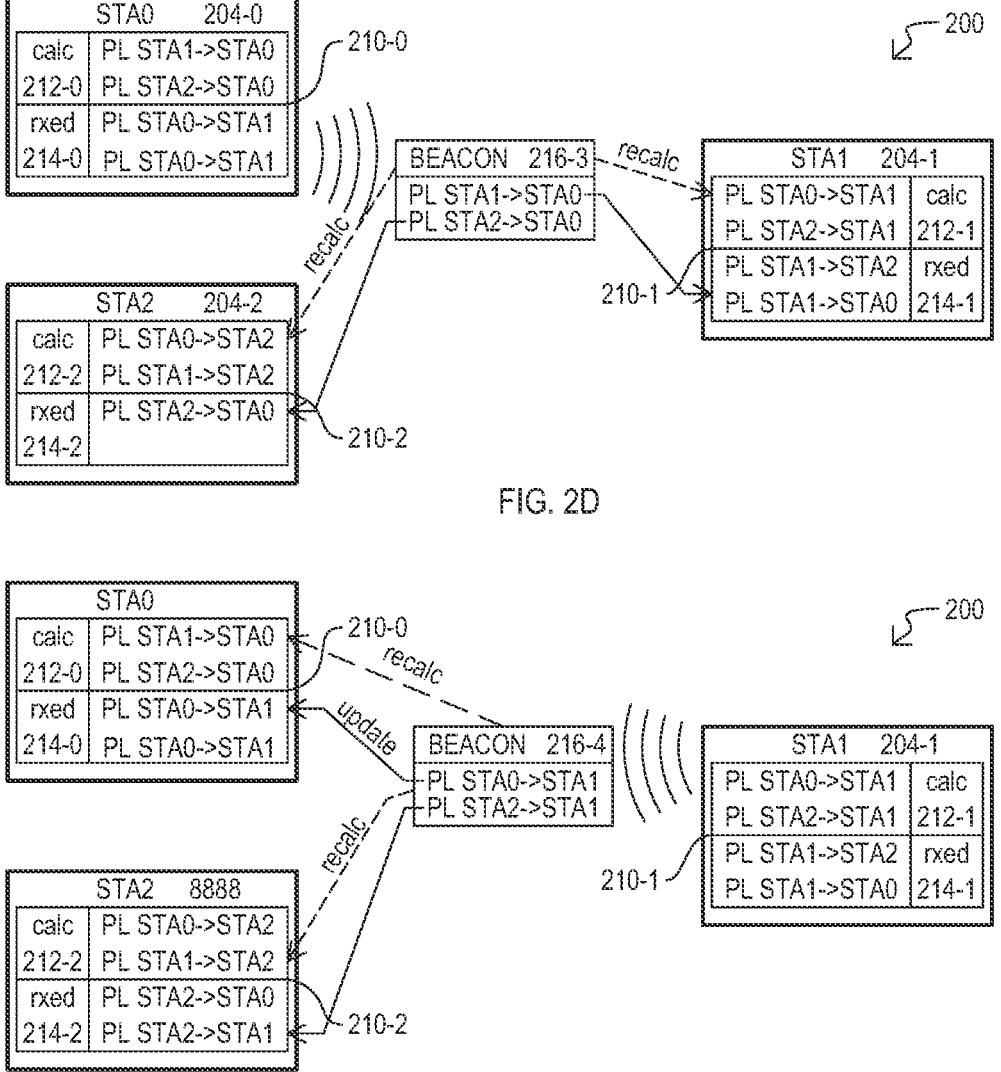
FIGS. 2D and 2E are diagrams further showing STAs of a system that can calculate path loss values and distribute such values to other STAs with beacon-like transmissions.

Referring to FIG. 2D, operations can occur as shown in FIG. 2A. However, in some embodiments STAs receiving transmission 216-3 can recalculate PL values. Thus, PL value "PL STA0->STA1" can be updated in calculation section 212-1 of STA1 204-1 and "PL STA0->STA2" can be updated in calculation section 212-2 of STA2 204-2.

Referring to FIG. 2E, eventually every STAs (204-0 to -2) having a calculation section (all STAs in FIGS. 2A to 2E) will receive and store a PL value from the other STAs. Further, such PL values can be periodically updated as transmissions are received.

In some embodiments, a system 200 can be a BSS and/or OBSS operating according to the IEEE 802.11ax standard. Further, transmissions (216-0 to -4) can be periodic beacon transmissions. In addition, STAs (204-0 to -2) may or may not be part of the same wireless network.

Figure 3:
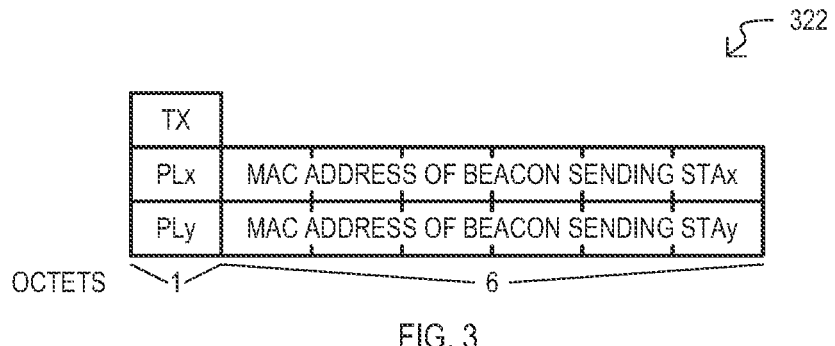
FIG. 3 is a diagram showing an information element that can be included in a beacon-like transmission according to an embodiment.

According to embodiments, STAs can periodically broadcast a beacon frame or other type of management frame that can contain an IE with the TX power of the frame and one or more PL value(s) for use by the other STAs. FIG. 3 shows an IE 322 that can be included in a data frame according to an embodiment. IE 322 can include a TX power value (TX) (i.e., power of the transmission containing the IE), one or more PL values (two shown as PLx, PLy), and a station identifiers corresponding to the PL values.

In the example shown, TX power can be a 1-octet value, indicating the TX power in dBm when the STA sends the beacon frame containing the IE 322. The IE 322 may contain an array of PL values. FIG. 3 shows an example of two PL values; however arrays can be larger if there are more than two compatible STAs in range, or an[d] IE can store but one PL value. It is understood that in some embodiments, an array of PL values can include those for STAs that are not part of sending devices BSS. Each PL value can be a 7-octet data structure. with a 1-octet value of the PL in dB and a 6-octet MAC address of the STA whose beacon frame was received and decoded by the sending STA. In some embodiments, only recently calculated PL values can be included in an IE. As but one example, a STA can include PL values generated in the past 100 ms or so. This can help ensure PL values reflect a current state of the wireless environment.

Figure 4:
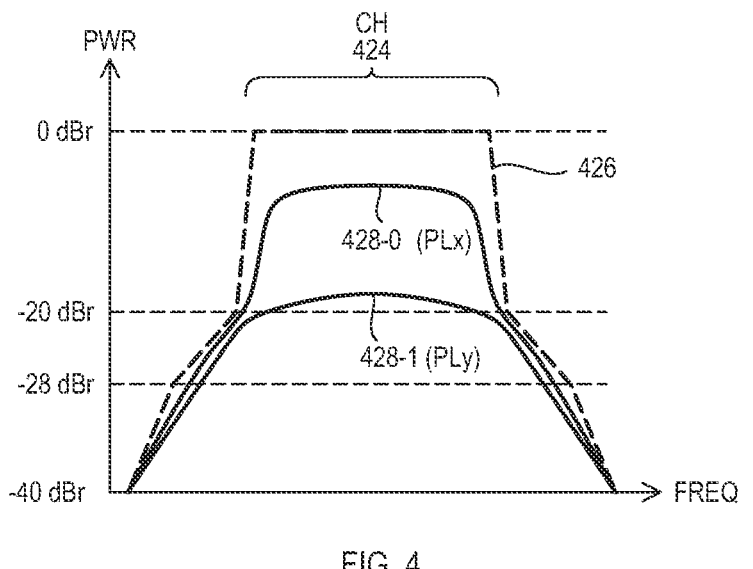
FIG. 4 is a diagram showing adjustable transmit (TX) power based on path loss according to an embodiment.

FIG. 4 is a graph showing control of RX power according to an embodiment. FIG. 4 shows power (PWR) versus frequency (FREQ) for a broadcasting channel 424 used by one or more wireless systems. A standard or protocol may indicate a first spectral mask 426 for the channel. As but one example, a spectral mask 426 can be a default and/or maximum TX power. According to embodiments, based on PL values, a STA may transmit at a lower power than the default value. For example, a transmission to a first destination STA may essentially follow a lower power spectral mask 428-0 that results from taking into account a path loss PLx to the destination STA. A transmission to a second destination STA, where PL value is lower (PLy<PLx), may follow an even lower power spectral mask 428-1.

It is understood that the particular shape of lower power spectral masks 428-0/1 are exemplary. Embodiments can arrive at lower TX power according to any suitable manner, including but not limited to excluding particular frequencies and/or frequency ranges within the channel 424.

Figure 5:
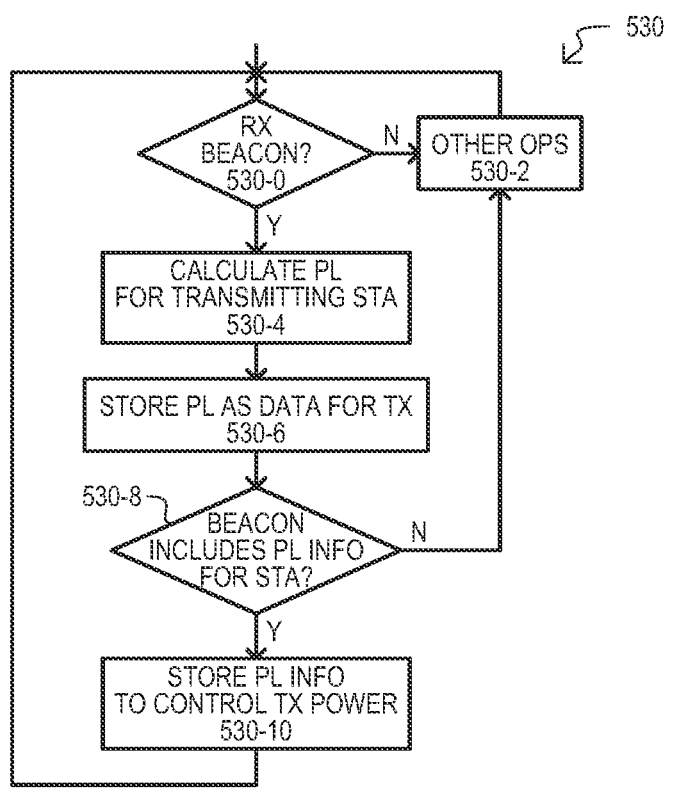
FIG. 5 is a flow diagram of a method for receiving a path loss beacon according to an embodiment.

FIG. 5 is a flow diagram of a method 530 according to an embodiment. A method 530 can be executed by a STA receiving a beacon-like transmission from another STA. A method 530 can include determining if a beacon-like transmission is being received 530-0. Such an action can include detecting a data frame having a particular identifier that designates it as a transmission that includes PL related data. In the absence of such a beacon-like transmission (N from 530-0) a method 530 can continue with other (e.g., standard) operations 530-2.

If a beacon-like transmission is received (Y from 530-0), a method 530 can calculate a PL value for the transmitting STA 530-4. Such an action can include any of those techniques described herein, including determining a received signal strength of the beacon-like transmission, and subtracting such a value from a TX power value. The transmission power value can be included in the beacon-like transmission. However, in other embodiments beacon-like transmission can occur at some maximum power known by all compatible STAs in the system, and so may not be included in the beacon-like transmission.

The receiving STA can store the calculated PL value for later transmission (530-6). The receiving STA may also determine if the beacon-like transmission includes PL information related to its own transmissions (530-8). Such an action can include checking the beacon-like transmission for data (e.g., an IE) that includes a station identifier (e.g., MAC address) for the receiving station. If the beacon-like transmission does not include such PL information (N from 530-8), the method 530 can resume other (e.g., standard) operations 530-2.

If the beacon-like transmission includes PL information for the receiving STA (Y from 530-8), the PL information can be stored by the receiving STA and used for controlling TX power to the indicated destination STA 530-10. Such a power adjustment can take any suitable form as described herein, or an equivalent. As but one example, a TX power can be selected to exceed the PL value by enough to enable the destination STA to detect the transmission, plus some safety margin, with the overall transmission being less than a maximum (or default) power level indicating by the standard/protocol by which the system is operating.

Figure 6:
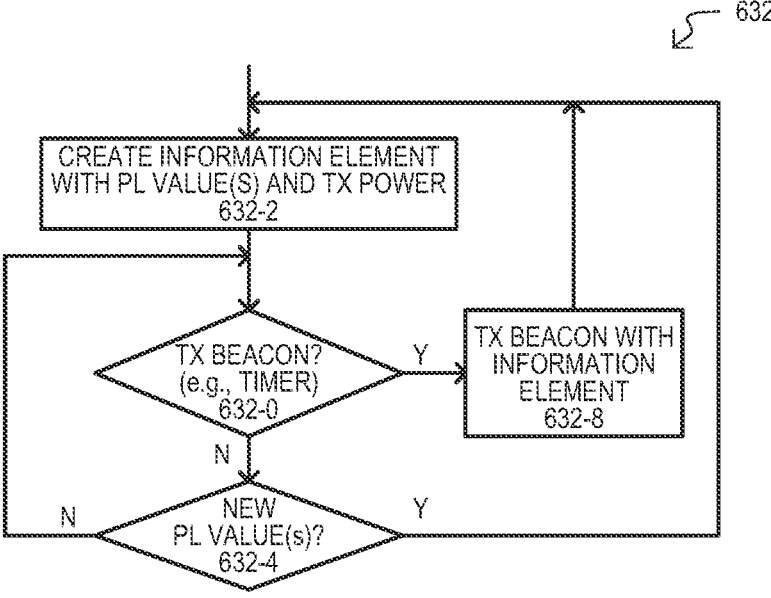
FIG. 6 is a flow diagram of a method for sending a path loss beacon according to an embodiment.

FIG. 6 is a flow diagram of a method 632 according to another embodiment. A method 632 can be executed by a STA to send beacon-like transmission with PL information to other STAs. A method 632 can include creating an IE with PL values and a TX power value 632-2. PL values can take the form of any of those described herein and can be values calculated by the sending STA in response to transmissions received from other STAs. However, in alternate embodiments, such values can be received from another device (e.g., an AP can gather values and send them to STAs of its BSS). A TX power value can indicate the power at which the beacon-like transmission will be sent. In some embodiments this can be a maximum allowable power.

A method 632 can then determine if a beacon-like transmission is to be sent 632-0. In some embodiments this can include running a timer so that beacon-like transmissions can be sent with a predetermined periodicity. However, alternate embodiments can include any other triggering event, including but not limited to requests for PL information or beacons by other devices, or the STA detecting or being informed of predetermined changes in the operating environment.

If a beacon-like transmission is not sent (N from 632-0), a method 632 can determine if there are any new PL values 632-4. Such an action can include determining if a new (or updated) PL value has been calculated in response to a transmission from another STA. If there is a new PL value (Y from 632-4), a method 632 can update the IE (632-2). If there is no new PL value (N from 632-4), a method 632 can return to 632-0.

When a beacon-like transmission is to be sent (Y from 632-0), a method 632 can transmit the beacon-like transmission with the IE containing the PL values and TX power 632-8. Such transmission can be made at a power level noted in the IE, and in some embodiments, can be full power as determined by the standard/protocol governing the system.

According to embodiments, a STA can adjust a TX power according to PL information associated with a destination STA. If an STA decides to transfer data, it can look for the latest PL information from its memory. Such a value may have been recently sent in a beacon-like frame by the destination STA. If no PL information exists, the STA can transmit the data at some predetermined (e.g., maximum allowed) TX power. If PL information does exist for a destination, the STA can transmit the data using a TX power that can offset the expected PL from itself to the destination STA, plus an optional safety margin. Such a TX power can be lower than a default (e.g., maximum allowed) power level.

In some embodiments, if the data are not correctly received by the destination STA, the sending STA can increase the safety margin and then retransmit the data. Such steps can be repeated until the data are received or a maximum allowed TX power is reached.

For incompatible STAs (i.e., STAs that cannot adjust TX power based on PL information) or for broadcast frames, data can be transmitted at a default TX power. In addition, if PL information for a destination STA does not exist, the STA can transmit data at the default TX power. In some embodiments, if PL information is stale (not recent enough), the STA can transmit data at the default TX power.

In the case of transmitting a multicast frame, assuming the sending STA has PL information for all destination STAs, the sending STA can use the TX power that can offset the highest PL from among the destination STAs, plus a safety margin.

Figure 7:
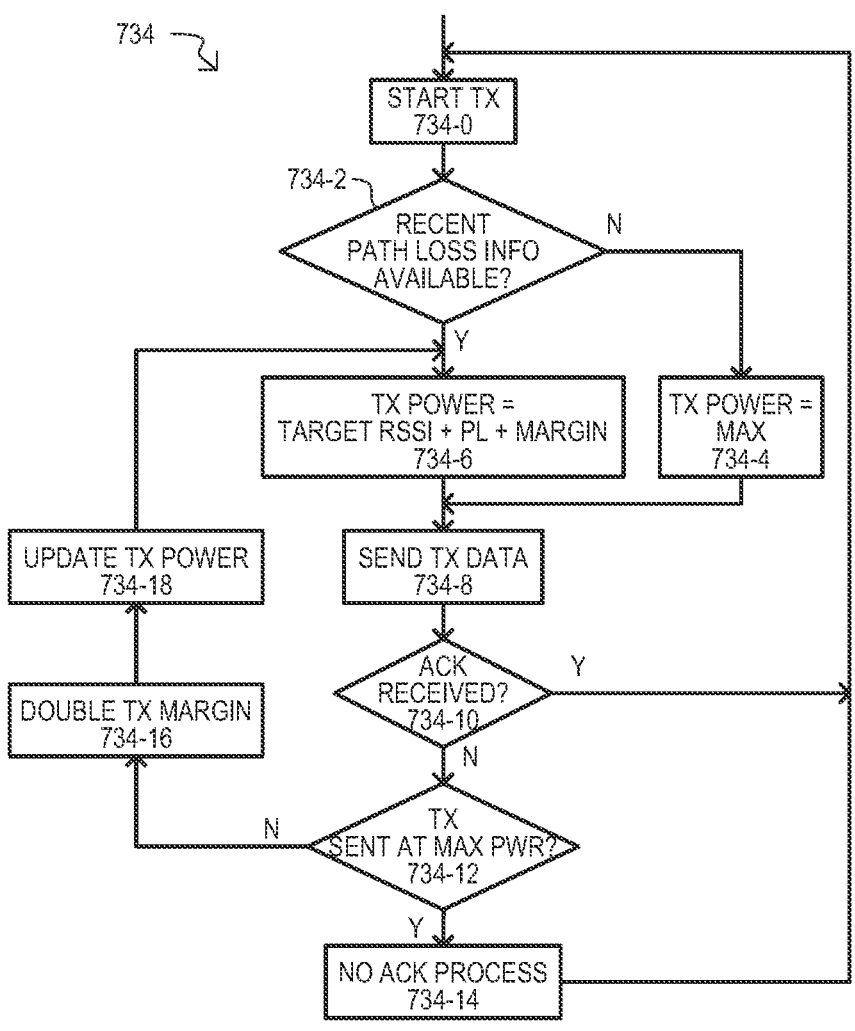
FIG. 7 is a flow diagram of a method for adjusting the power of a data transfer based on path loss information according to an embodiment.

FIG. 7 is a flow diagram of another method 734 according to an embodiment. A method 734 can be executed by a STA when sending data to another STA. According to method 734, a TX power can be adjusted according to PL information for a destination STA. A method 734 can include beginning a data transmission operation 734-0. Such an action can be initiated by an application running on a device, as but one of many possible examples. A method 734 can determine if there is recent PL information for the destination STA 734-2. Such an action can include checking for PL information that was previously received and is now stored at a predetermined location. In some embodiments, such an action can also include accessing a time value (e.g., time-stamp) associated with the PL value to determine how recently the PL information was received. If no PL information exists for the destination (or such PL information is determined to be stale) (N from 734-2), a method can transmit at a default power, which in the embodiment shown, can be a maximum power 734-4.

If valid PL information exists for the destination (Y from 734-2), a method can transmit at a reduced power level intended to surpass the expected PL, plus some margin 734-6. In the embodiment shown, the TX power can be given by:

$$TX\ POWER = RSSI + PL + MARGIN$$

where RSSI can be a desired received signal strength indication at the destination STA, PL is the path loss to the destination STA, and MARGIN is some additional power level. However, a reduced TX power can be achieved at using any other suitable manner that can account for PI while remaining below a default TX power. Once a TX power has been determined, a method can transmit the data at the determined TX power 734-8.

In the embodiment shown, a method 734 can then determine if an acknowledgement (ACK) of the TX data is received 734-10. If an ACK is received (Y from 734-10), a method 734 can return to 734-0. In the event an ACK is not received (N from 734-10), if the data transfer was at a maximum allowable power (Y from 734-12), a method 734 can follow operations for failing to receive an ACK (e.g., retransmit) 734-14.

If the data transfer was not at a maximum allowable power (N from 734-12), a method 734 can increase the value of the MARGIN used to calculate at a TX power 734-16. In the embodiment shown, such an increase includes doubling the TX margin. However, this should not be construed as limiting. TX margin can be increased by greater or lesser amounts. With the new MARGIN value, a TX power can then be updated 734-18. A method 734 can then retransmit the TX data (go to 734-6 or 734-8).

According to embodiments, wireless devices can control TX power based not only on PL information for devices of their own network, but on potential interference from a neighboring network. Such capabilities are referred to herein as "good neighbor" TX opportunity detection and will be described with reference to FIGS. 8A and 8B. While FIGS.

8A and 8B will be described with reference to overlapping networks operating according to an IEEE 802.11 standard, such an arrangement should not be construed as limiting. The capabilities described herein could be deployed in any other suitable wireless networks.

Figure 8A:
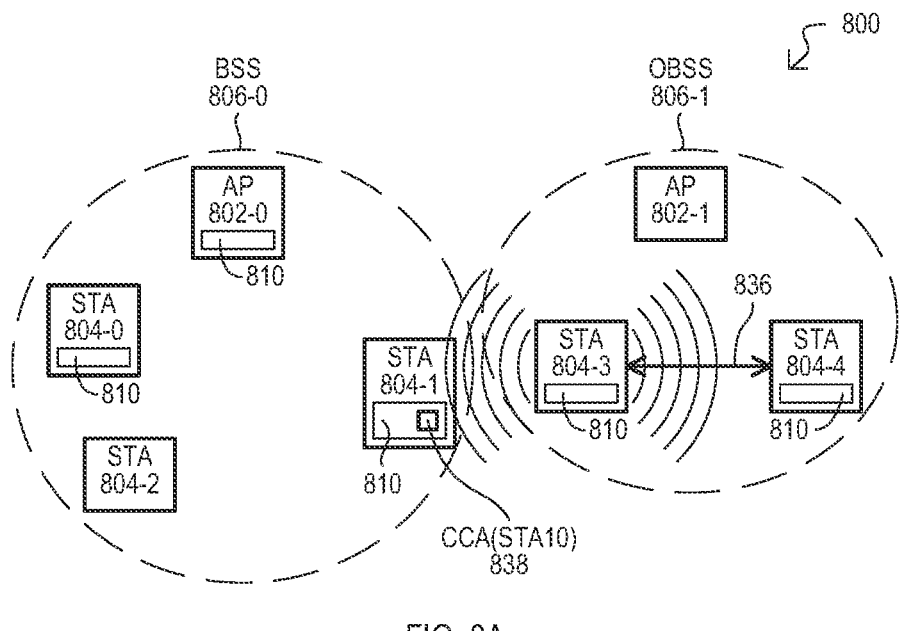
FIGS. 8A and 8B are a diagrams showing "good neighbor" transmit opportunity operations according to an embodiment.
Figure 8B:
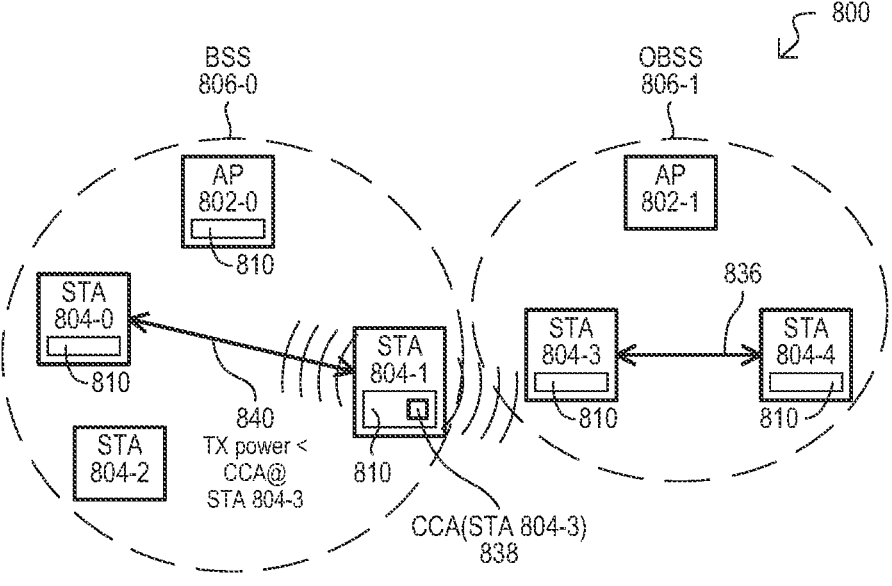

FIGS. 8A and 8B are diagrams of a wireless environment that includes a first network (BSS) 806-0 and a neighboring network (OBSS) 806-1. BSS 806-0 can include an AP 802-0 and STAs 804-0 to -2. STA 804-1 can include communication circuits 810, which can enable dynamic power control of transmitted signals based on PL information as described herein, or equivalents. In the example of FIGS. 8A and 8B, AP 802-0 and STA 804-0 also include such communication circuits 810. However, fewer or greater numbers of devices can include communication circuits 810.

OBSS 806-1 can include its own AP 802-1 as well as STAs 804-3 and 804-4. STAs 804-3 and 804-4 can include communication circuits 810. BSS 806-0 and OBSS 806-1 are configured to potentially use a same range of transmission frequencies. That is, a channel used by BSS 806-0 is the same as, overlaps, or is a portion of that used by OBSS 806-1, or vice versa.

Referring still to FIGS. 8A and 8B, in the operations described it is assumed that STA 804-3 in OBSS 806-1 is currently making transmission 836 to STA 804-4. Further, STA 804-1 in BSS 806-0 is preparing to make a transmission to STA 804-0.

When STA 804-1 has some data to send, it can first sense if the medium is free. As but one example, STA 804-1 can execute a carrier sense operation on the channel and determine a TX opportunity based its own threshold (e.g., CCA). If a TX opportunity exists within its own BSS 806-0, even with concurrent data transfer 836 occurring in OBSS 806-1, STA 804-1 can determine an adjusted TX power level less than a maximum allowed to transmit to destination STA 804-0, as described for various embodiments herein or an equivalent.

However, before the data transfer is made, STA 804-1 can also calculate the estimated received signal strength (e.g., RSSI) that would result at concurrent transferring STA 804-3 in OBSS 806-1. STA 804-1 can make such a determination in any suitable manner, but in some embodiments, it may use PL information 838 received from neighboring STA 804-3. If the estimated received signal strength at concurrent transferring neighboring STA 804-3 is lower than an interference threshold (e.g., CCA) for STA 804-3, STA 804-1 can initiate its data transfer request to destination STA 804-0 of its BSS 806-0.

Referring to FIG. 8B, it is assumed that a data transfer by STA 804-1 is determined to not interfere with concurrent data transfer 836 by neighboring STA 804-3. Thus, STA 804-1 can execute a concurrent data transfer 840 to STA 804-0. The TX power can be at a level less than that which would trigger a CCA threshold at neighboring STA 804-3.

However, if STA 804-1 had determined that a data transfer to STA 804-0 would interfere with concurrent data transfer 836 by neighboring STA 804-3, the data transfer could be canceled or delayed.

In some embodiments, in the event a reduced TX power concurrent data transfer (e.g., 840) is not successful, STA 804-1 can increase a TX power level as described herein, or an equivalent. Each time STA 804-1 increases a TX power for retransmission, it can again determine an estimated effect (e.g., RSSI) at any concurrent transferring STAs in a neighboring BSS (e.g., OBSS 806-1). If the new estimated effect at any concurrent transferring neighboring STAs is lower than an interference threshold (e.g., CCA) of the neighboring STAs, STA 804-1 can retransmit the data. Otherwise, STA 804-1 can delay data retransmission until channel clearance to avoid interference.

According to embodiments, a throughput of multiple networks (e.g., BSSs) operating on the same channel can be improved if all networks execute "good neighbor" TX opportunity detection, as described herein or an equivalent. In a worst-case scenario, STAs of a neighboring BSSs can transfer data sequentially with maximum allowable TX power as specified in current standard.

Figure 9:
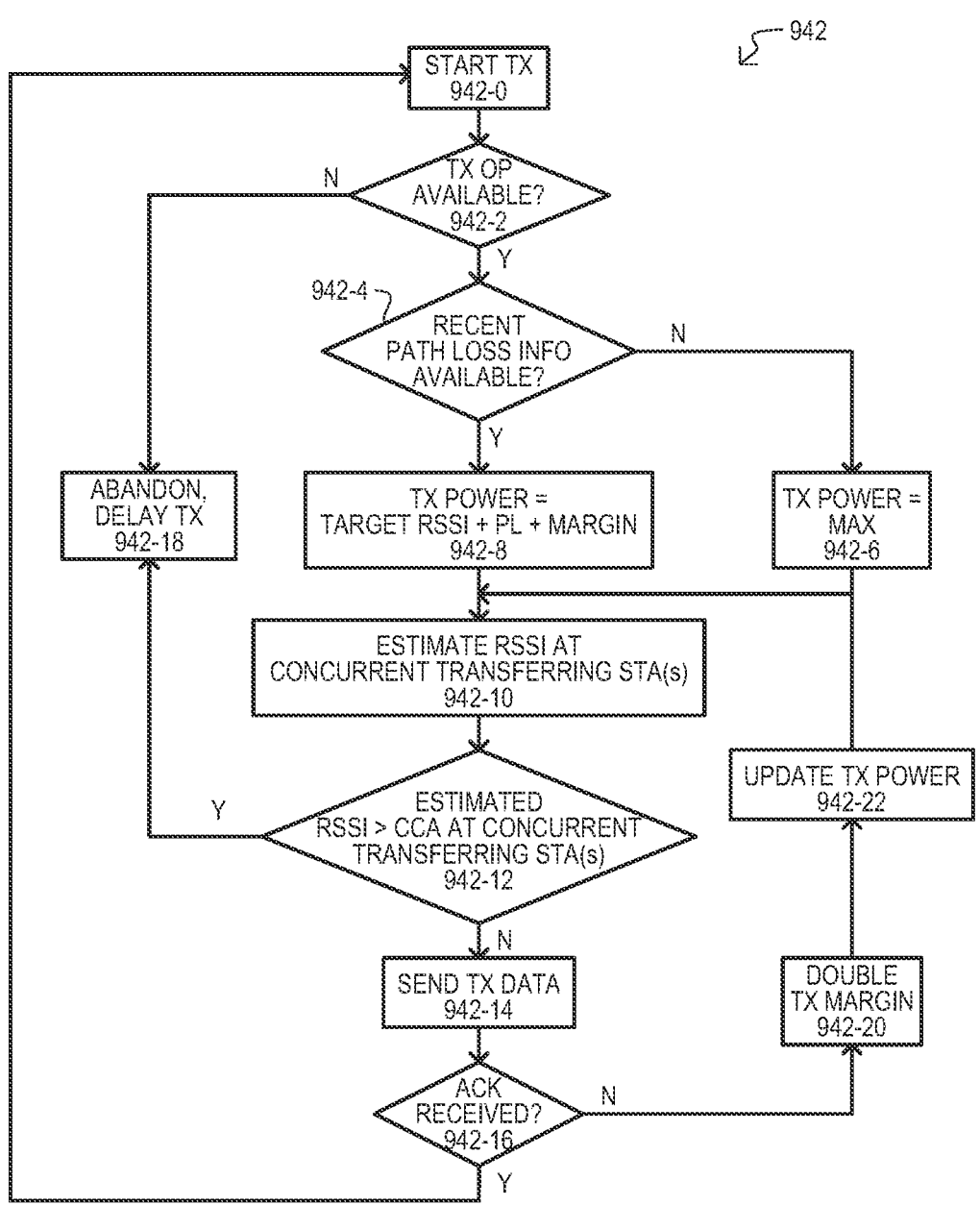
FIG. 9 is a flow diagram showing a "good neighbor" transmit opportunity method according to an embodiment.

FIG. 9 is a flow diagram of a method 942 for "good neighbor" TX opportunity detection according to an embodiment. A method 942 can be executed by a STA when sending data to another STA in an environment where neighboring STAs are making concurrent data transfers.

A method 942 can include beginning a data transmission operation 942-0. A method 942 can determine if there is a TX opportunity in its network 942-2. Such an action can include a STA executing a CCA, or the like. However, any suitable action can be taken according to the governing standard/protocol. If a TX opportunity is determined not to exist (N from 942-2), a method 942 can delay or abandon the data transfer 942-18.

If a TX opportunity is determined to exist (Y from 942-2), a method 942 can determine if there is PL loss for the destination STA 942-4. If no PL information exists for the destination STA (N from 942-4), a method can transmit at a default power, which in the embodiment shown, can be a maximum power 942-6. If valid PL information exists for the destination (Y from 942-4), a method can determine a reduced power level for transmission to the destination 942-8. Such actions can be the same as those shown by 734-2, 734-4 and 734-6 in FIG. 7.

Based on a determined TX power (i.e., TX POWER of 942-8 or MAX power of 942-6), a method 942 can estimate an RSSI at a concurrent transferring STA 942-10 (of another BSS). If an estimated RSSI is greater than a CCA at the concurrent transferring STA (i.e., there is a likelihood of interference) (Y from 924-12), a method can delay or abandon the data transfer 942-18. If an estimated RSSI is not greater than a CCA at the concurrent transferring STA (N from 924-12), a method can send the data at the determined TX power 942-14. If an ACK is received for the data transfer (Y from 942-16), a method 942 can return to 942-0.

If an ACK is not received for the data transfer (N from 942-16), and if the data transfer was not at a maximum allowable power, a method 942 can increase the value of the MARGIN used to arrive at a TX power 942-20. With the new MARGIN value, a TX power can then be updated 942-22, and a method 942 can return to 942-10 (determine RSSI at neighboring STA(s)).

The various methods described herein can be executed by APs or STAs in any suitable manner. In some embodiments, such methods can take the form of microcode and firmware present in MAC layer circuits of a WLAN device. However, such a particular implementation should not be construed as limiting.

Figure 10:
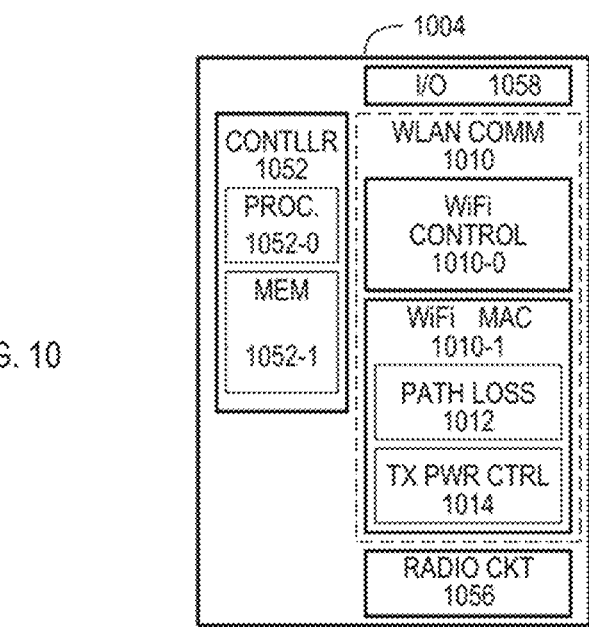
FIG. 10 is a block diagram of a wireless communication device according to an embodiment.

FIG. 10 is a block diagram of a device 1004 according to an embodiment. In some embodiments, device 1004 can be one implementation of a STA as described herein. A device 1004 can include communication circuits 1010, a controller 1052, radio circuits 1056, and input/output (I/O) circuits 1058. Communication circuits 1010 can be WLAN circuits, including a WiFi control circuit 1010-0 and WiFi MAC circuits 1010-1. WLAN circuits can operate in any suitable band, including but not limited to a 2.4 GHz band, 5.0 GHz band and/or 6.0 GHz band.

Wi-Fi MAC circuits 1010-1 can include a PL section 1012 and TX power control section 1014. A PL section 1012 can include circuits for storing PL information received from other devices over a wireless connection. PL information can correspond to an expected loss of signal power when transmitting from the device 1004 to a destination device and can identify values unique to each destination device. PL values can take the form of any of those described herein or an equivalent. Further, PL values can be for devices in a same network (e.g., BSS) as device 1004, but can also be for devices in a different network (e.g., neighboring or overlapping BSS). In some embodiments, PL section 1012 can also include circuits for generating (and updating) PL values for transmission to other devices, as described herein or equivalents. Such circuits can include any suitable arithmetic-logic circuits which can calculate PL based on a signal received from another device. Arithmetic-logic circuits can include fixed logic, programmable logic, one or more processors executing instructions, and any combination thereof.

Power control section 1014 can include circuits for controlling a TX power for device 1004. In particular, power control section 1014 can adjust a TX power to a level lower than a default (e.g., maximum) power level based on a PL information for a destination, as described herein or an equivalent. As in the case of PL section 1012, power control section 1014 can include any suitable arithmetic-logic circuits. In some embodiments, power control section 1014 can output signals to radio circuit 1056 to control a TX power level.

Radio circuits 1056 can include circuits for receiving and transmitting signals according to at least one standard or protocol. Radio circuits 1056 can include any suitable circuits according to a selected protocol, and in some embodiments can include physical interface (PHY) circuits and baseband circuits. Radio circuits 1056 can control a TX power level based on signals/values received from communication circuits 1010. In some embodiments, radio circuits 1056 can transmit/receive on any internationally recognized industrial, scientific, or medical (ISM) band. In some embodiments, radio circuits 1056 can comply with an IEEE 802.11 standard, such as the IEEE 802.11ax standard.

A controller 1052 can control operations by communication circuits 1010. In some embodiments, a controller 1052 can include circuits (or instructions executable by circuits) for determining when transmission is to be made, as well as which data are included in transmissions. In some embodiments, PL values can be stored in controller 1052, rather than or in addition to communication circuits 1010. A controller 1052 can schedule path loss transmissions (e.g., beacons) from device 1004, including sending such transmissions in a periodic fashion. In the embodiment shown, a controller 1052 can include a processor section 1052-0 and a memory section 1052-1. Memory section 1052-1 can include, or can be written to include, instructions for forming a PL data frame, including creating an array of PL values with corresponding identifiers. Memory section 1052-1 can also be configured to store PL values for subsequent transmission.

I/O circuits 1058 can enable control of device 1004 by inputting external to the device 1004. I/O circuits 1058 can include circuits to enable communication with the device 1004 according to any suitable method, including any of various serial data communication standards/methods including but not limited to: serial digital interface (SDI), universal serial bus (USB), universal asynchronous receiver transmitter (UART), I²C, or I²S.

In some embodiments, device 1004 can be an integrated circuit device, with the various portions being included in one integrated circuit package or formed in a same integrated circuit substrate.

Figure 11:
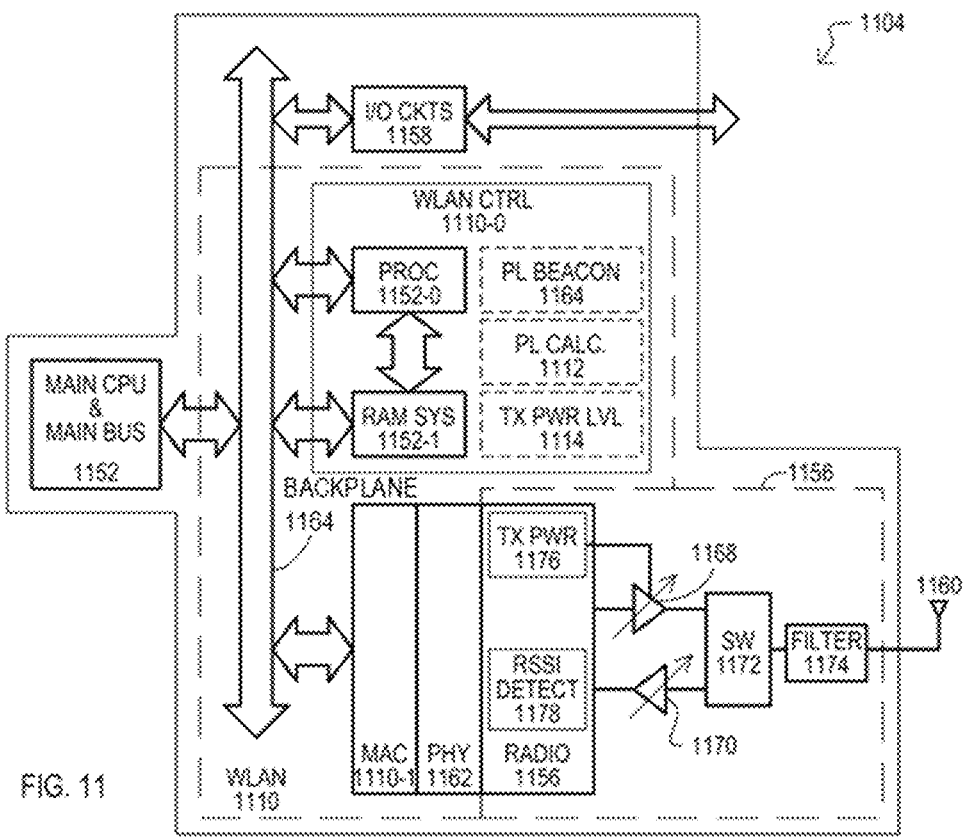
FIG. 11 is a block diagram of a wireless communication device according to another embodiment.

FIG. 11 is a block diagram of a device 1104 according to another embodiment. A device 1104 can be a compatible station as described in various embodiments herein, and equivalents. A device 1104 can include communication circuits 1110, a controller 1152, radio circuits 1156, I/O circuits 1158, and an antenna connection 1160. Communication circuits 1110 can include WLAN control circuits 1110-0, MAC layer circuits 1110-1, and physical layer (PHY) circuits 1162.

WLAN control circuits 1110-0 can enable communication to occur according to one or more communication standards, including the IEEE 802.11ax standard, as but one example. In the embodiment of FIG. 11, WLAN control circuits 1110-0 can include a processor section 1152-0 and a memory system 1152-1. A processor section 1152-0 can include one or more processors configured to execute instructions stored in memory system 1152-1. A processor section 1152-0 can include one or more general purpose processors and/or application specific processors. A memory system 1152-1 can include one or more memory types which can be configured to store instructions executable by processor section 1152-0 as well as store data for use by processor section 1152-0. In some embodiments, memory system 1152-1 can include random access volatile memory (e.g., dynamic and/or static RAM), as well as nonvolatile read-only-memory (e.g., flash memory).

WLAN control circuits 1110-0 can provide various functions, including a PL beacon function 1164, PL calculation function 1112 and TX power control function 1114. A PL beacon function 1164 can include assembling a PL data frame in a memory system 1152-1 for transmission by device 1104. A PL data frame can have a type or other field that designates it as a beacon or other type of multicast data frame for reception by multiple other devices. The PL data frame can include PL values generated (and periodically renewed) by the device 1104 that are now being transmitted to other devices, so that the other devices have a PL value for transmissions back to the device 1104. Each PL value can have a corresponding identifier (e.g., MAC address). A PL data frame can also include a TX power for the beacon.

PL calculation function 1112 can generate PL values from transmissions detected from other devices. In some embodiments, a PL calculation function 1112 can generate a PL value from an RSSI value generated by radio section 1156, as well as a TX power included in data frame corresponding to the transmission generating the RSSI value.

TX power control function 1114 can generate a TX power value for outgoing data frames. A TX power can be adjusted based on a PL value for a destination device, as described herein and equivalents. In some embodiments, a TX power control function 1114 can also adjust a TX power value based on "good neighbor" TX opportunity detection, as described herein and equivalents.

MAC layer circuits 1110-1 can perform MAC layer operations, including the incorporation of suitable headers, error correction and length fields, as well as fragmentation and reassembly of data frames. MAC layer circuits 1110-1 can receive data from and send data to WLAN control circuits 1110-0 over a backplane 1164. PHY layer circuits 1162 can perform PHY layer operations, including but not limited to converting MAC layer data into a format suitable for the wireless medium being used, as well as controlling the modulation of outgoing data frames and the demodulation of incoming data frames.

A radio section 1156 can include radio circuits 1166, power amplifier circuits 1168, low noise amplifier (LNA) circuits 1170, switch circuits 1172, and filter circuits 1174. Radio circuits 1166 can convert data frames into suitable radio signals for transmission, as well as receive radio signals for demodulation into data frames. In the embodiment of FIG. 11, radio circuits 1166 can include TX power circuits 1176 and RSSI detect circuits 1178. TX power circuits 1176 can vary a TX power of power amplifier circuits 1168 in response to values received from WLAN control circuits 1110-0 via MAC and PHY layer circuits (1110-1, 1162).

Power amplifier circuits 1168 can establish a TX power for data frames. LNA circuits 1170 can amplify received signals for processing by radio circuits 1156. Switch circuits 1172 can selectively switch antenna connection 1160 between power amplifier circuits 1168 and LNA circuits 1170. Filter circuits 1174 can filter received signals according to the medium used. Antenna connection 1160 can be configured to connect to an antenna assembly. While FIG. 11 shows one antenna connection, embodiments can include multiple antenna connections.

While embodiments can benefit numerous applications where wireless systems are deployed, systems that employ numerous networks in close proximity to one another can derive significant improvement in performance and power savings. One particular example system of such a system will now be described by way of example.

Figure 12:
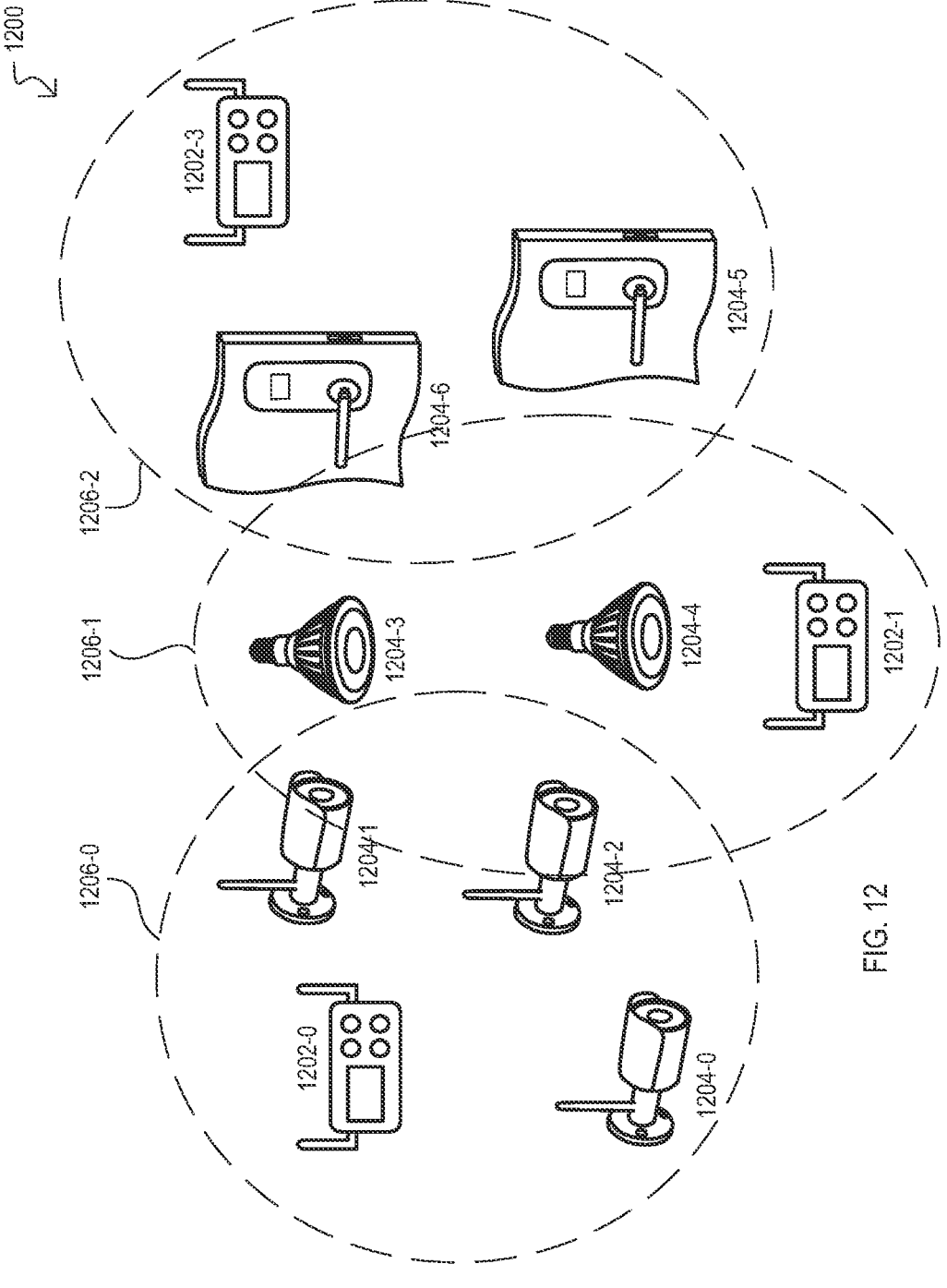
FIG. 12 is a diagram of a system of internet-of-things devices according to an embodiment.

FIG. 12 show a site control system 1200 according to an embodiment. A system 1200 can include various BSSs 1206-0, -1, -2, operating in relatively close proximity to one another at the site. BSSs (1206-0 to -2) can be formed by APs 1202-0 to -2 and STAs 1204-0 to -5. STAs (1204-0 to -5) can be Internet-of-Things (IoT) type devices. While each STA (1204-0 to -5) can have any suitable function, in the embodiment shown, STAs of a same BSS (1206-0 to -2) can have a same function. For example, STAs 1204-0 to -2 of BSS 1206-0 can be security devices, STAs 1204-3 and -4 of BSS 1206-1 can be lighting devices, and 1204-5 and -6 of BSS 1206-2 can be control devices.

BSSs (1206-0 to -2) can all share a same channel or operate on channels that can overlap with one another.

Some or all of STAs (1204-0 to -6) can have TX power adjustment capabilities as described herein (e.g., reducing TX power based on a PL value for a destination STA and/or based on the possible effects on a concurrent transmission in a neighboring BSS).

In a conventional system, multiple BSSs deployed nearby one another that share a same channel can result in limited or impaired throughput performance due to OBSS interference with each other. However, according to embodiments, STAs (1204-0 to -6) can have instantaneous, or near instantaneous RSSI reports for other compatible STAs, and can regulate TX power to promote simultaneous traffic within each BSS. This can reduce interference between STAs (both within the same BSS and neighboring BSSs) as well as reduce power consumption. Further, such adaptive and dynamic changes in TX enables TX power to vary as the operating environment at the site varies.

While the various features of the embodiments are understood by this description, particular features of the embodiments can include:

1. STA path loss IE broadcasting. Every compatible STA can periodically broadcast a beacon frame or other types of management frame at a maximum allowed TX power. Such a frame can contain a TX power value and path loss IE.

2. STA beacon receiving. Every compatible STA can receive, decode, and save TX power and PL information for transmission paths between itself and other compatible STAs operating on the same channel (or an overlapping channel). Thus, every compatible STA can store the most recent PL information for data transfers from itself to other compatible STAs.

3. STA data transfer. Based on instantaneous, or essentially instantaneous PL information, every compatible sending STA can transmit data using a lowest determined TX power that can assure sufficient SINR for its data to be received correctly at its destination STA with some safety margin. In case of transmitting a multicast frame, the sending STA can use a TX power that can offset the highest PL of all destination STAs, plus a safety margin. Optionally, some data transfers can happen in parallel among OBSS's if these STA pairs have sufficient distance from one another, and if the RSSI of the TX power of a sending STA in one pair remains below a CCA sensing threshold of other STA pairs.

4. STA data retransmission. If the data transfers are not correctly received by a destination STA, the sending STA can increase a TX power margin (e.g., double the margin) until reaching the maximum allowed TX power. The sending STA can then check an estimated RSSI at any concurrent transferring STAs in neighboring BSSs. If the estimated RSSI value is lower than the CCA threshold, then the STA can retransmit the data. Otherwise, the STA can delay a data retransmission until channel clearance occurs, to avoid OBSS interference.

5. Incompatible STAs. For incompatible STAs, data can be transmitted with a maximum allowed TX power. In addition, if PL information is not available between a pair of STAs, each STA can assume the other counterpart is an incompatible STA that does not support PL-based TX power adjustment.

The various novel features presented by the embodiments are recognizable by those skilled in the art. Such features can include, but are by no means limited to:

1) Practical implementations for TX power control and parallel data transfer among OBSS's.

2) An IE in a beacon (or other management) frame that includes TX power and PL information. Through broadcasting and receiving this information, every compatible STA is able to know the essentially instantaneous PL from itself to all other compatible STAs.

3) For data transfer and retransmission, a sending STA can use PL information to determine a lowest TX power necessary for successful reception of its data at destination STA for unicast or STAs for multicast.

4) Based on PL information, a sending STA can determine whether parallel data transfer among OBSS's is to take place by estimating RSSI at concurrent transferring STAs in neighboring BSSs. This can reduce the OBSS interference level.

Embodiments can provide various advantages that are evident to those skilled in the art. One of many such advantages, is the ability of IEEE 802.11ax compatible STAs to transmit data simultaneously across an 80 MHz bandwidth in an OBSS environment. Compared with conventional approaches, such a capability can provide traffic throughput improvement, TX power savings, or both.

Embodiments can benefit battery-operated industrial or home IoT products in which power consumption and overall throughput can be key differentiating factors to users. Improved power consumption and overall throughput can substantially increase the value of such a product over those presenting only conventional performance.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A wireless device, comprising:
wireless communication circuits compatible with at least one 802.11 wireless standard and including:
a power control section configured to dynamically change transmission (TX) power for transmissions to a destination station device (STA) based on path loss (PL) information for the destination STA, the PL information corresponding to a loss in TX power from the wireless device to the destination STA;
a power detection section configured to detect a received signal strength of incoming beacon frames transmitted from other STAs; and
a PL section configured to:
extract multi-bit incoming PL information for each of a plurality of STAs from incoming beacon frames received from such STAs, the multi-bit incoming PL information for the incoming beacon frames corresponding to a same outgoing beacon frame from the wireless device and
determine multi-bit outgoing PL information for at least a first STA from at least one of the incoming beacon frames; wherein
the incoming beacon frames are beacon frames according to the at least one 802.11 wireless standard.

2. The wireless device of claim 1, wherein the PL section includes media access control (MAC) circuits in an integrated circuit device.

3. The wireless device of claim 1, wherein:
the PL section is further configured to:
include the outgoing PL information for at least one STA in an outgoing beacon frame, the outgoing beacon frame configured to be received by STAs of a same or different wireless network as the wireless device; and
the wireless device further comprising radio circuits configured to transmit the outgoing beacon frame.

4. The wireless device of claim 3, wherein:
the wireless device operates according to a predetermined communication standard; and
the radio circuits are configured to transmit the outgoing beacon frame at a maximum power according to the communication standard.

5. The wireless device of claim 3, wherein the radio circuits are configured to periodically transmit outgoing beacon frames.

6. The wireless device of claim 1, wherein:
the PL section includes at least one processor configurable to:
extract a TX power value from an incoming beacon frame received from a STA,
determine a received power value for the same incoming beacon frame, and
subtract the received power value from the TX power value.

7. A wireless device, comprising:
communication circuits compatible with at least one 802.11 wireless standard and configured to receive incoming beacon frames that each include an information element (IE) with path loss (PL) values for a plurality of station device (STA) pairs, each PL value corresponding to a loss in transmit (TX) power from one STA to the other STA of the STA pair, the communication circuits including
a power control section configured to dynamically change a TX power for transmissions to a destination STA based on the PL value corresponding to such destination STA, and
a power detection section configured to detect a received signal strength of the incoming beacon frames, the incoming beacon frames configured to be received by a plurality of STAs and the wireless device essentially simultaneously; and
radio circuits configured to transmit frames to and receive frames from at least some of the plurality of STAs.

8. The wireless device of claim 7, wherein the IE further includes a device identification values and a corresponding PL value for each STA pair.

9. The wireless device of claim 8, wherein the device identification values comprise MAC addresses for the corresponding STA pairs.

10. The wireless device of claim 7, wherein:
the communication circuits are further configured to generate outgoing beacon frames that each include PL values from received beacon frames, as well as outgoing PL values, the communication circuits further including:
a PL calculation section configured to generate the outgoing PL values for other STAs from the received signal strength of transmissions received from such other STAs.

11. The wireless device of claim 7, wherein:
the communication circuits are further configured to:
if path loss value for a STA has been received within a time period, adjust transmission power of communications to the STA according to such PL value, and
if path loss value for the STA has not been received within the time period, setting a transmission power of communications to the STA to a maximum value.

12. The wireless device of claim 7, wherein the wireless device is a STA in a basic service set.

13. The wireless device of claim 7, wherein the wireless device is an access point of a basic service set.

14. The wireless device of claim 7, wherein:

the communication circuits are further configured to:

receive PL values for an out of network STA in an overlapping basic service set, determine an estimated signal strength at the out of network STA for a transmission to an in network STA, the in network STA being part of a basic service set that includes the wireless device, if the estimated signal strength at the out of network STA does not exceed a predetermined threshold, transmitting to the in network STA, and if the estimated signal strength at the out of network STA does exceeds the predetermined threshold, delaying or abandoning the transmission to the in network STA.

\* \* \* \* \*